United States Patent [19]

Nightengale

[11] Patent Number: 4,505,680
[45] Date of Patent: Mar. 19, 1985

[54] SPHERICAL STAR CHART WITH INDICATOR

[76] Inventor: Thomas E. Nightengale, 215 "I" St., Laporte, Ind. 46350

[21] Appl. No.: 480,875

[22] Filed: Mar. 31, 1983

[51] Int. Cl.³ ............................................. G09B 27/06
[52] U.S. Cl. .................................................. 434/289
[58] Field of Search ............... 434/289, 284, 285, 286, 434/287, 131, 135, 137

[56] References Cited

U.S. PATENT DOCUMENTS

| | | | |
|---|---|---|---|
| 1,422,642 | 7/1922 | Walters | 434/131 |
| 2,083,988 | 6/1937 | Dupler | 434/131 |
| 2,754,597 | 7/1956 | Sylvestor | 434/287 |
| 3,257,728 | 6/1966 | Blomquist | 434/289 X |
| 4,096,646 | 6/1978 | Solem | 434/289 X |

Primary Examiner—William H. Grieb
Attorney, Agent, or Firm—Thomas J. Dodd

[57] ABSTRACT

The concept of The Spherical Star Chart With Indicator is based on the fact that a majority of the celestial objects maintain a constant angular relationship with each other. The distance of these celestial objects from the center of the earth is so great that parallax due to observations made from the surface of the earth is negligible. The motion of the earth in its orbit and the rotation of the earth about its axis cause the celestial objects to appear to move at a constant rate. When the axis of a sphere is aligned parallel to the axis of the earth and the sphere is made to rotate at the apparent rotation of the celestial objects then the co-ordinates of the position of a celestial object in the sky will be identical to the co-ordinates of its symbol on the sphere.

The linkage between the sight and the indicator as hereinbefore described assures that the movement of the indicator is equal to the movement of the sight.

Since most celestial observations are made at night the necessity of a lighted spot as an indicator is obvious.

Flat radial segments of the star chart facilitate the printing of and the application of the decalcomania to the star chart.

The use of pressure sensitive adhesive makes it easier to replace any one segment of the star chart when a change is necessary.

5 Claims, 32 Drawing Figures

Fig. 2
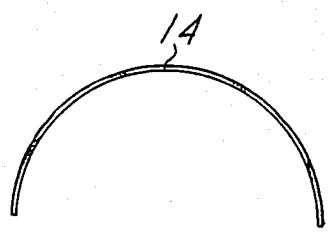
Fig. 3
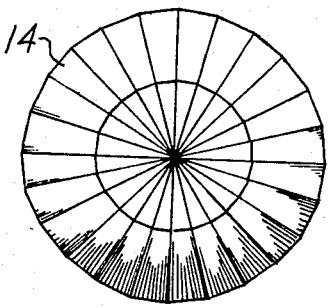
Fig. 4
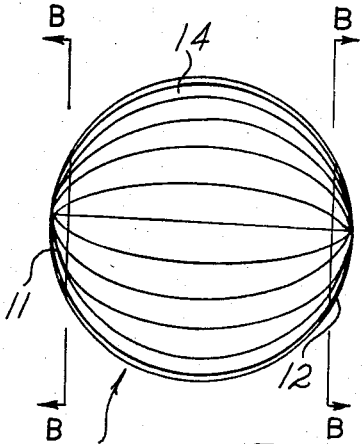
Fig. 5
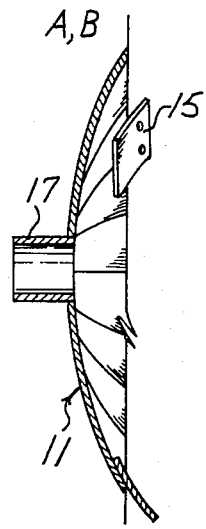
Fig. 11
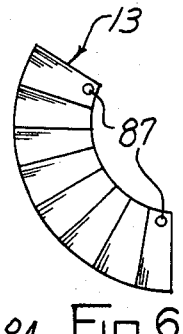
Fig. 6
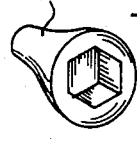
Fig. 9
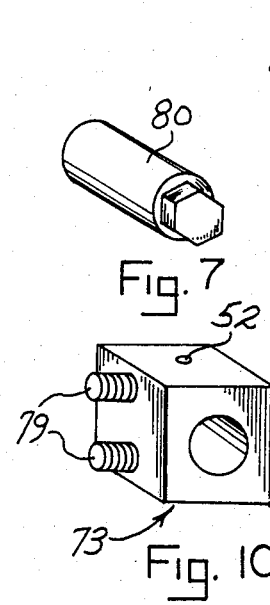
Fig. 7
Fig. 8
Fig. 10
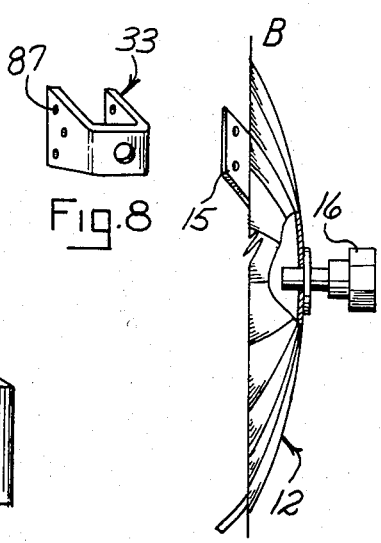
Fig. 12

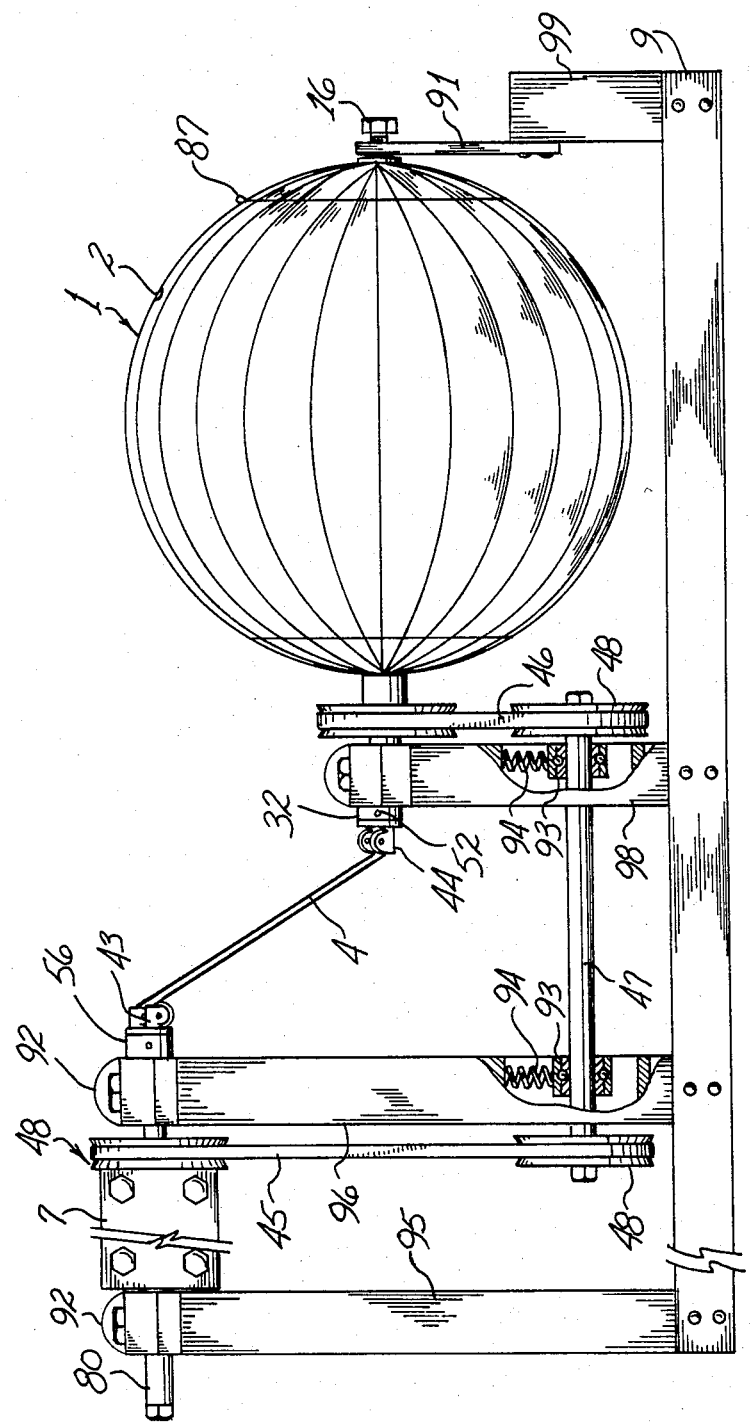

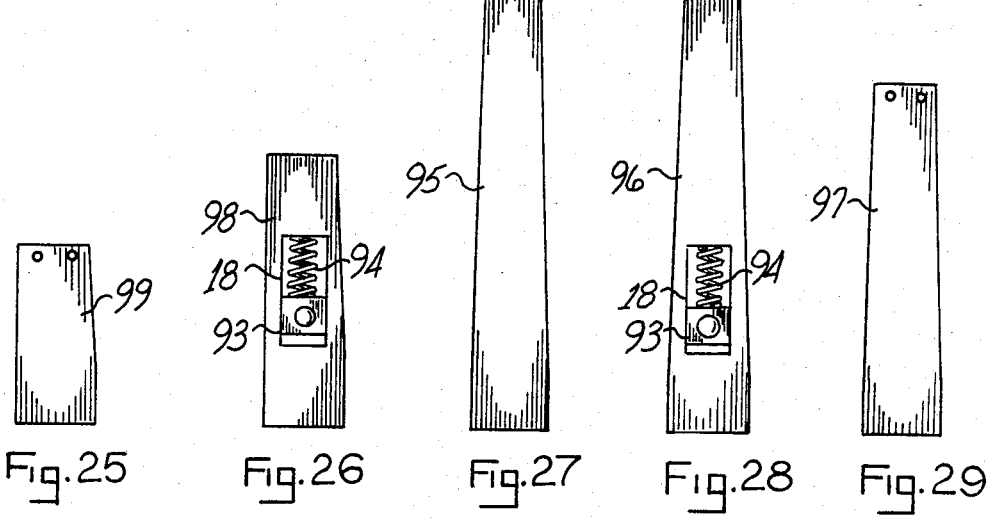
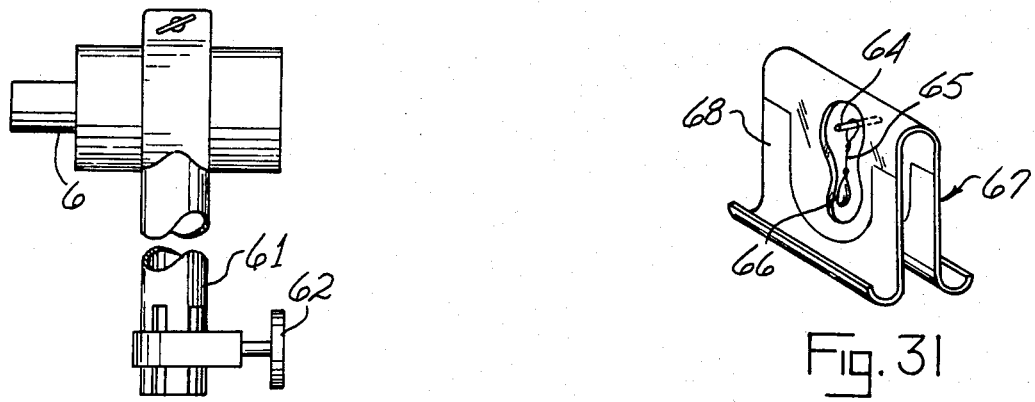
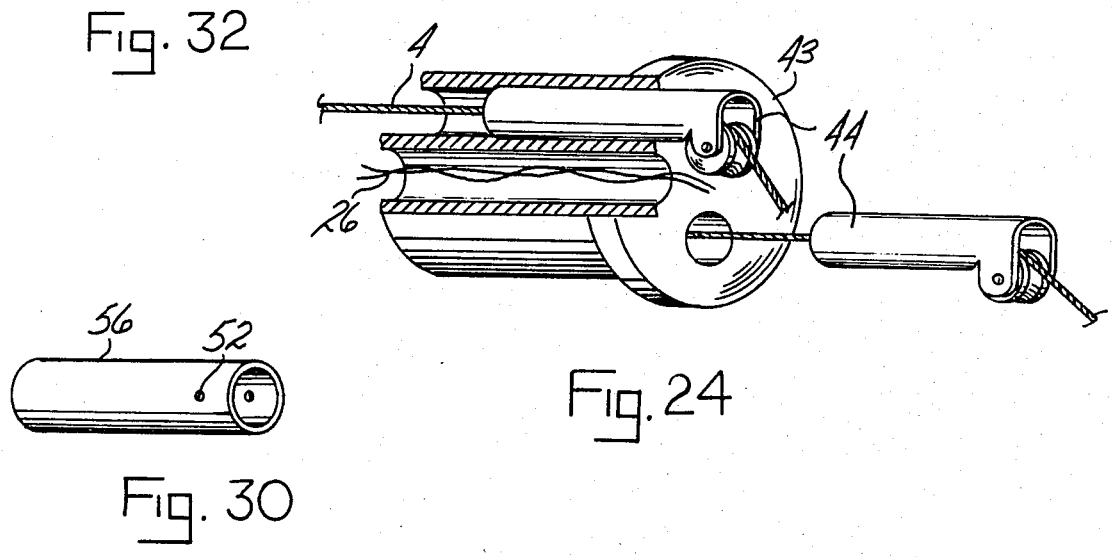

SPHERICAL STAR CHART WITH INDICATOR

This invention is designed to aid the novice astronomer to become acquainted with the constellations and to aid in the identification of celestial bodies that the novice observes without the mathematical procedure that is now used. This is accomplished by linking a sight (a sight tube, a telescope, binoculars or any other sighting device) to a light source that is installated inside a transparent sphere. The light source is focused so that a spot of light appears on the surface of the sphere. The linkage between the sight and the light source enables the spot of light to move as the sight moves. Appliqued onto the surface of the sphere are the astronomical co-ordinates of hour angle and declination as well as the respective locations of the constellations and other celestial bodies marked by appropriate symbols and names. Thus, when the novice astronomer causes the spot light to illuminate any one symbol on the surface of the sphere, the identity of the celestial object can be researched in a variety of astronomical tables that are available.

The star chart is a sphere-like structure made of a given number of curved longitudinal segments that are flat in the direction of latitude. This arrangement facilitates manufacture by allowing the printing of the necessary data on a similarly shaped decalcomania and attaching the decalcomania to the segment with pressure sensitive adhesive. This permits easy replacement of the decalcomania when additional information is added to the star chart.

The indicator is a spot of light.

A brief description of the figures:

FIG. 2 is a plan view and end view of a segment #14 of the star chart #1 before being formed.

FIG. 3 is item #14 after forming.

FIGS. 4 and 5 represent the sphere-like figure created when a given number item #14 are joined together. The end view, FIG. 4, and the side view, FIG. 5, are shown. Line A—A is for a section view of FIG. 11. Parallel lines of truncation B—B are shown.

FIG. 6 is an end view of a one-third section of the truncated body of item of FIGS. 4 and 5, an equatorial division.

FIG. 7 is a drawing of the hour angle drive shaft #80.

FIG. 8 is the indicator wheel end support #33.

FIG. 9 is a drawing of the clock driven socket #84.

FIG. 10 is a drawing of the hour angle frame end pieces #73 and #74.

FIG. 11 is a sectional view of a truncated polar end along lines A—A and B—B of FIGS. 4 and 5.

FIG. 12 is a side view with a cut out of a truncated polar end of FIGS. 4 and 5 along lines B—B.

Figure 13:
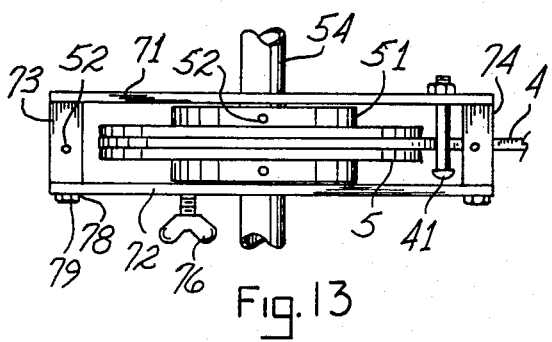

FIG. 13 is the top view and

Figure 15:
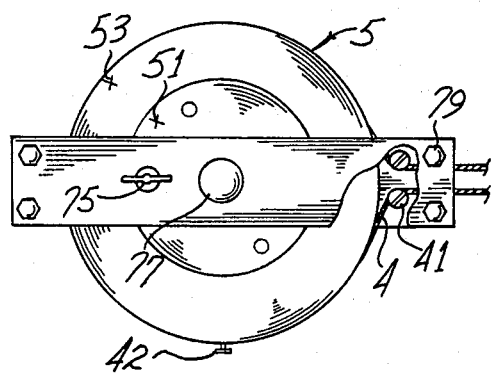

FIG. 15 is the side view of the hour angle frame assembly #7 with the drive wheel assembly #5 installed.

Figure 14:
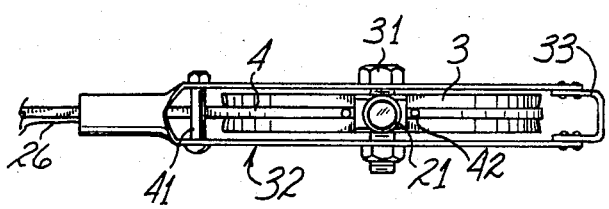

FIG. 14 is the top view and

Figure 16:
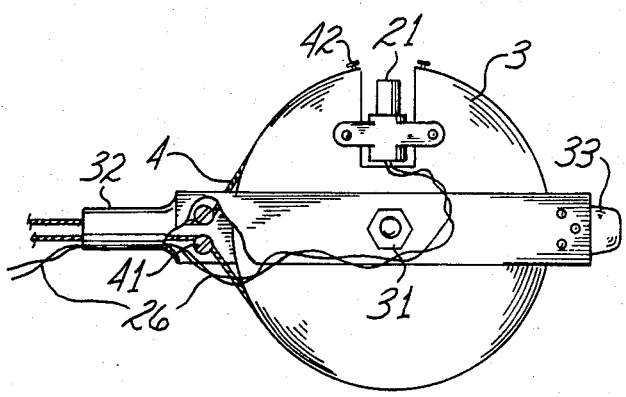

FIG. 16 is the side view of the indicator wheel assembly.

Figure 17:
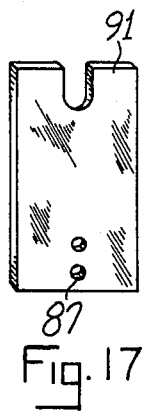

FIG. 17 shows the star chart end bearing #91.

Figure 18:
Figure 19:
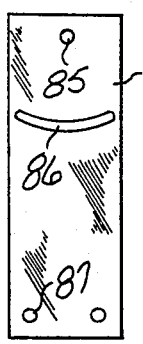
Figure 20:

FIGS. 18, 19 and 20 are the face view and side views of the clock drive mounts #81 and #81A.

Figure 21:
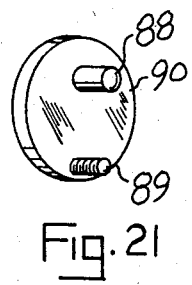

FIG. 21 is a view of the clock back plate #90.

Figure 22:
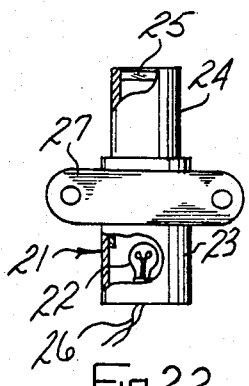

FIG. 22 is a cutaway sketch of the light spot assembly #21.

FIG. 23 is a partial drawing of The Spherical Star Chart With Indicator showing the additional items needed to have the star chart #1 on an elevation other than the same elevation as the hour angle frame #7.

FIG. 24 is a view of the external belt guide supports #43 showing external belt guides #44, power source wires #26 and belt #4.

FIGS. 25, 26, 27, 28, and 29 are the front views of the pillar configurations #99, #98, #95, #96, and #97.

FIG. 30 is the hour angle support shaft #56.

FIG. 31 is a drawing of the protractor assembly #67.

FIG. 32 illustrates the arrangement of the sight #6, the sight mount #61, and the sight lock #62.

Figure 1:
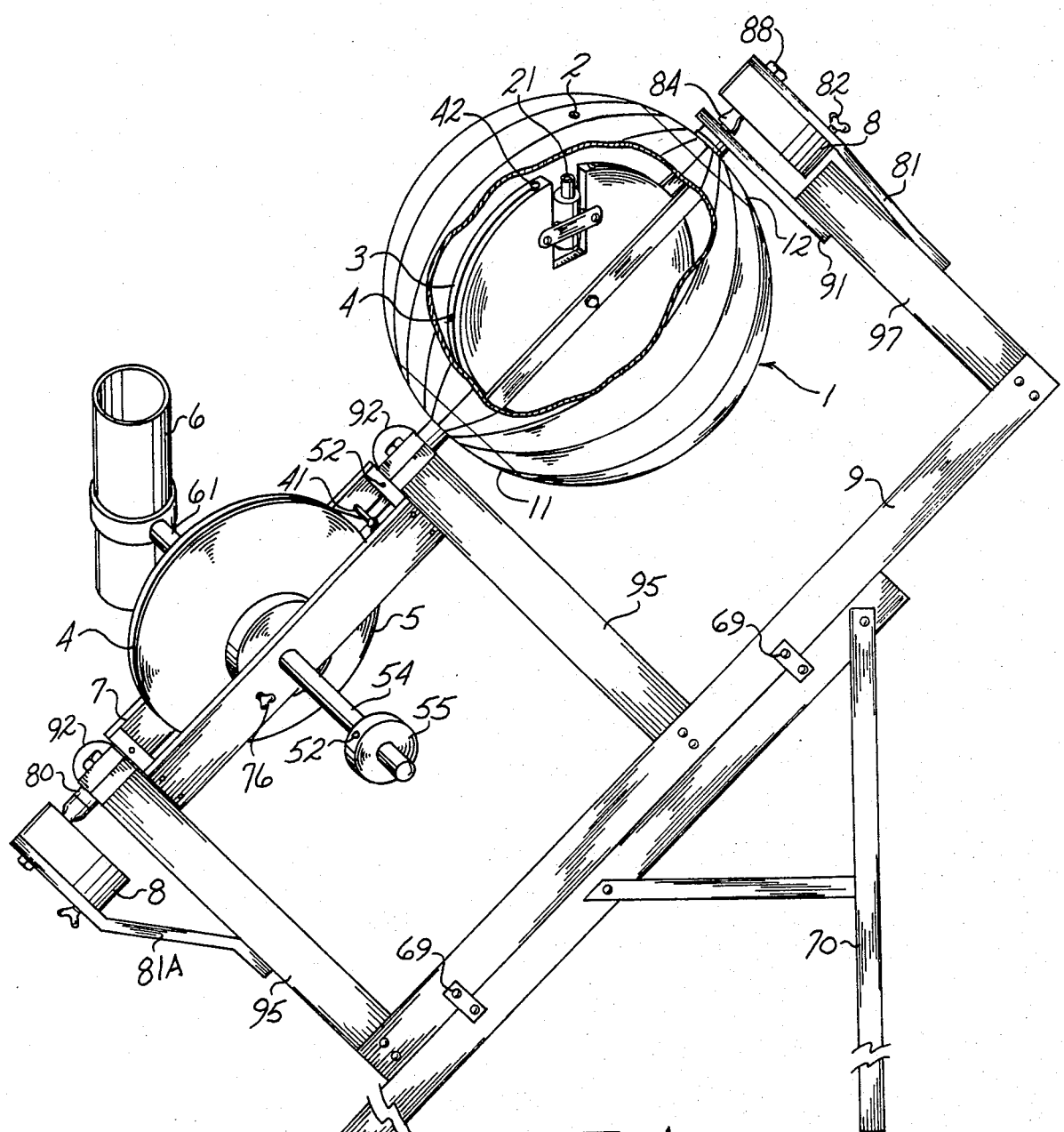
FIG. 1 is a side view of the Spherical Star Chart With Indicator as mounted on an equatorial mount #70.

The assembly drawings are FIGS. 1 and 23.

FIG. 1 is a side view of The Spherical Star Chart With Indicator assembled without one section of the equatorial division #13 of the star chart #1 being installed to allow the internal mechanisms to be illustrated. The center line of the star chart #1 and the center line of the hour angle frame #7 are on the same elevation.

Not all sights are the same length. To allow a long sight to rotate in the vertical plane could place the star chart #1 in an awkward viewing position. To offset this obvious limitation of the mechanism illustrated in FIG. 1, an alternate mechanism is illustrated in FIG. 23.

FIG. 23 is a partial view of The Spherical Star Chart With Indicator illustrating the additional mechanisms necessary when the center line of star chart #1 and the center line of hour angle frame #7 are not on the same elevation. The star chart #1 is completely assembled in FIG. 23.

A detailed description of parts follows:

In FIG. 1 the foundation frame #9 is two rigid beams of the same dimensions, on the same plane and parallel to each other. Set between the beams, flush to the bottom, perpendicular, and fastened securely to the said beams are three pillars. One pillar is at each end and the third pillar is near the center of the said beams. The end pillar designated as item #97 and shown in a front view in FIG. 29 supports the star chart end bearing #91 of FIG. 17. The other two pillars are identical and are designated as item #95 and shown in the front view in FIG. 27 and support identical split bearings #92.

In FIG. 23 the foundation frame #9 is two rigid beams of the same dimension, on the same plane and parallel to each other. Set between the beams, flush to the bottom, perpendicular and fastened securely to the said beams are four pillars, Two pillars support the hour angle frame #7 and two pillars support the assembly that includes item #32 and the star chart #1. In this partial side view, of FIG. 23, the pillars #95, #96, and #98 support identical bearings #92. The pillar #99 supports item #91. Pillars #96 and #98 have a slot, item #18, to accomodate bushing block #93 and take-up spring #94.

In FIGS. 1,4,5, and 23 the star chart assembly #1 is a sphere like structure made of segments of transparent material cut to the shape shown in FIG. 2 and formed into a semi-circle as in FIG. 3. A given number of these segments #14 are joined at their edges to form the sphere-like structure shown in the two views of FIGS. 4 and 5. In these drawings the width of segment #14 represents one hour angle of astronomical time or fifteen degrees of arc and the length represents one hundred and eighty degrees of declination.

To facilitate the assembly of The Spherical Star Chart With Indicator the sphere-like structure of FIGS. 4 and 5 is divided into convenient sections. The polar ends of items FIGS. 4 and 5 are truncated parallel to the equator. The remaining body is divided along longitudinal lines into equal sections. FIGS. 11 and 12 are the polar ends and FIG. 6 is one-third of the body of FIG. 1, refered to as an equatorial division #13.

In FIG. 11 one of the polar ends of FIG. 4 has a hole cut through at the very center. A length of transparent tubing #17 of the same material as item #14 is firmly attached to the polar end protruding from the convex surface as shown in FIG. 11. Mounting tabs #15 are spaced equally around the circumference and attached firmly to the concave surface of the polar end. The mounting tabs #15 extend beyond the circumference and are drilled and threaded to match the mounting holes #87 shown on item #13 FIG. 6. This sub assembly of the star chart #1 is refered to as the free end #11.

FIG. 6 is a view of one-third of the body section of FIGS. 4 and 5 of item #1. Item #87 designates the location of the mounting holes that align with the threaded holes in mounting tabs #15 of FIGS. 11 and 12.

In FIG. 12 one of the polar ends of FIGS. 4 and 5 has a hole drilled through the exact center. The diameter of the hole is such that it will accept the shaft end of item #16. Item #16 of FIG. 12 is a machined part made of the same material as item #14. Item #16 is attached firmly to the convex surface of the polar end with the shaft end protruding beyond the concave surface of the polar end. Item #16 is refered to as the star chart drive shaft #16. Mounting tabs #15 are spaced equally around the circumference and attached firmly to the concave surface of the polar end. The mounting tabs #15 extend beyond the circumference and are drilled and threaded to match the mounting holes #87 shown on item #13 FIG. 6. This sub assembly of the star chart #1 is refered to as the driven end #12.

In FIGS. 1 and 23 the light spot #2 is a spot of light focused onto the surface of the star chart #1 from a light source inside the star chart #1. This light spot #2 is the "indicator" of The Spherical Star Chart With Indicator.

FIG. 22 is a cut-away drawing of the light source assembly #21. A lense #25 is mounted in the end of focusing tube #24. Focusing tube #24 slides inside main body tube #23 determining the size of the light spot #2. Mounting tabs #27 are attached to the main body tube #23. Bulb and bulb socket #22 are inside the main body tube #23. Power from a low voltage source is supplied to the bulb through wires #26.

The indicator wheel #3 is a disc of sufficient radius to accomodate the length of the light spot assembly #21 and not be obstructed in rotating by protrubances inside the star chart #1. The width of the disc is such that the light spot assembly #21 can be centered and fit flush within both faces of the disc as shown in FIGS. 1, 14 and 16. The material used in the indicator wheel #3 must be rigid and light in weight. The indicator wheel #3 rotates about an axle #31. The axle #31 is a shoulder screw. The axle #31 is supported by the indicator wheel frame #32.

Refering to the two views of FIGS. 14 and 16: the indicator wheel frame #32 is fabricated from rigid tubular material. One end of the tubular material is slit, flattened and formed into a fork. The fork is deep enough to accomodate the end support #33, belt guides #41, the indicator wheel #3 and the power source wires #26. The end support #33 is made of transparent material and formed as shown in FIG. 8. Mounting holes are drilled in the sides of item #33 and the face is of the same curvature as the concave surface of the star chart #1. A hole is drilled through the center of the face of the end support #33 to accept the shaft end of item #16 of FIG. 12. The end support #33 is attached to the fork end of item #32. At a distance equal to the inside radius of the star chart #1 and measuring from the fartherest point of the end support #33 holes are drilled through the fork tines to accomodate axle #31. Measuring from the center of the axle hole towards the tubular end of item #32, at a distance greater than the radius of item #3, holes are drilled for the belt guides #41. The belt guides #41 are pieces of tubing slipped over shoulder screws and fastened to the indicator wheel frame #32. The screws that anchor the ends of belt #4 are located on each side of the opening for item #21 and are designated as belt fasteners #42.

In FIGS. 1, 13, 14, 15, 16, 23, and 24 the belt #4 is a flexible linkage that transfers the rotational motion of the drive wheel #5 to the indicator wheel #3, causing light spot #2 to move longitudinally on the surface of the star chart #1. Belt guides #41 and #44 direct the travel of the belt #4 through indicator frame #32 and the hour angle frame #7.

In FIGS. 1, 13, and 15 the drive wheel #5 is a disc with exactly the same radius and thickness as the indicator wheel #3. Spacers #51 are firmly attached to both faces of item #5. The declination shaft #54 extends through the center of item #5 and is locked in position with set screws #52. The drive wheel assembly #5 with the declination shaft #54 as an axle rotates in hole #77 of the hour angle frame #7.

In FIGS. 1, 13, 15, and 23 the hour angle frame #7 is composed of items #71, #72, #73, #74, #76, #79, #41, and #44. The belt guide side #71 has a hole #77 in the center of its face for the declination shaft #54. Attached permanently to the ends of item #71 are the end pieces #73 and #74 of FIG. 10. The threaded studs #79 of FIG. 10 are perpendicular to item #71 and the hole in items #73 and #74 are aligned with each other. The belt guides #41 are bolted to item #71 next to item #74. The lock side #72 of the hour angle frame #7 has one hole #77 in the center of the face for the declination shaft #54, two holes #78 on each end to admit items #79, and a threaded hole #75 for lock bolt #76. The lock side #72 is bolted to the end pieces #73 and #74. The lock bolt #76 when needed presses against item #51 and prevents the drive wheel assembly #5 from rotating. Item #52 designates set screws.

In FIGS. 1 and 32 the sight #6 represents a sighting device that is used by an observer to locate individual celestial objects in the sky. The sight mount #61 is made of a length of tubing which will slip over the declination shaft #54. One end of the sight mount #61 is split and formed to hold the sight #6 securely. The other end has several short slits which will compress when the sight lock #62, a thumb Screw clamp, is slipped over item #61 and tightened.

FIG. 31 is a drawing of the protractor #67. The protractor #67 is formed as shown from a piece of transparent material. After forming of the material a pin #64 is inserted at the top and a string #65 and a bob #66 are hung from pin #64. The faces of item #67 are covered with masking tape #68. An arc originating from the pin #64 is scribed on the masking tape #68. The masking tape inside of the arc is removed.

In FIGS. 1, 7, and 23 the hour angle drive shaft #80 is a round shaft with a hex end. The hex end of item #80 is the same as the hex end of item #16 of FIG. 12.

In FIGS. 23 and 30 the hour angle support shaft #56 is a hollow tube.

In FIGS. 1 and 9 the clock driven socket #84 is a tool socket hex shaped to fit onto items #16 and #80 and modified to attach to the drive shaft of an astronomical clock.

In FIG. 1 the clock drive assembly #8 is representative of some device to cause the star chart #1 and the hour angle frame #7 to move in the direction of the celestial bodies as time elapses. The hex shapes of the connecting assemblies #16, #80, and #84 represent a simple quick-disconnect device. The clock drive shown is an off-the-shelf twenty-four hour timer. To permit the clock drives #8 to rotate the hour angle frame #7 and the star chart #1 in the same direction, one of the twenty-four hour timers turns counter-clockwise. When observing in the northern hemisphere the star chart #1 must turn counter-clockwise and during observations in the southern hemisphere the star chart #1 must turn clockwise.

The clock back plate #90 of FIG. 21 is attached securely to the back of the clock #8 and the assembly refered to is item #8 in FIG. 1. The back plate #90 is of rigid material with the round shaft #88 secured in line with the drive shaft of the clock. A threaded stud #89 is attached to item #90 at the greatest distance away from item #88 as possible. Item #82 is a wing nut threaded to fit item #89.

FIGS. 18, 19, and 20 illustrate the front view and side views of the clock mounts #81 and #81A. The spring type material used is formed as shown in the side views. In the front view of FIG. 19 the hole #85 fits over shaft #88, and the slot #86 fits over stud #89 of FIG. 21. Holes #87 are mounting holes. Item #81 mounts onto pillar #97 of FIG. 1 and pillar #99 of FIG. 23. Item #81A mounts onto pillar #95 of FIGS. 1 and 23.

THE ASSEMBLY OF THE SPHERICAL STAR CHART INDICATOR

Pertaining to FIG. 1, the frame assembly:

Securely attach or bolt two pillars of item #95 and one pillar of item #97 to beams #9 as located in FIG. 1. Mount the bottom halves of the split bearings #92 to the tops of pillars #95. Mount the star chart bearing #91 on the inside face of pillar #97. Align the centers of the three bearings and secure these bearings to their respective pillars.

Pertaining to FIG. 23, the frame assembly:

Securely attach or bolt pillars #95, #96, #98, and #99 to the beams #9 as shown in FIG. 23. Mount the bottom halves of the split bearings #92 to the tops of pillars #95, #96, and #98. Mount the star chart bearing #91 on the inside face of pillar #99.

The following instructions apply to both FIGS. 1 and 23, unless noted otherwise.

Assemble clock #8 by attaching drive socket #84 onto the drive shaft of clock #8. Place hole #85 of the clock mount #81 over shaft #88, and slot #86 over stud #89 of the back plate #90, thread wing nut #82 onto stud #89 and tighten.

For FIG. 1, align the center of the drive socket #84 with the center line of the bearings #91 and #92 and fasten mount #81 to pillar #97 with machine screws.

For FIG. 23, align the center of the drive socket #84 with the center line of the bearings #91 and #92 and fasten mount #81 to pillar #99 with machine screws.

Place drive shaft #16 of driven end of star chart assembly #12 into saddle of star chart bearing #91 and engage drive socket #84 over hex end of item #16.

Install light spot assembly #21 in cutout made in the indicator wheel #3 as in FIGS. 14 and 16.

Assemble the indicator wheel frame #32 by securing item #33 to the open end of the fork and installing the belt guides #41. Over the tubular end of item #32 slide the free end #11 of the star chart #1 so that the concave surface is towards the end support #33.

For FIG. 23 add sheave #48 over the tubular end of item #32 and secure. Drape belt #46 over sheave #48. Locate the hole of indicator wheel end support #33 over the protruding end of the star chart drive shaft #16 in item #12 and lower the partial assembly into bearing #92 on pillar #99. Secure the top half on item #92.

For FIG. 1, partially assemble the hour angle frame #7 by permanently joining the end pieces #73 and #74 to the ends of the belt guide side #71 while aligning the holes and with the studs #79 perpendicular to item #71. Insert into the hole of end piece #73 the hour angle drive shaft #80 of FIG. 7 and secure with set screw #52 in item #73. Near end piece #71 install internal belt guides #41.

For FIG. 23, assemble the hour angle frame #7 as above, then insert the hour angle frame support shaft #56 into the hole of item #74 and secure with set screw #52 of item #74. Place a sheave #48 over item #56, against item #74 and secure with set screw in item #48. Drape belt #45 over sheave #48. Install this sub assembly of item #7 in the bearing halves on pillars #95 and #96 with sheave #48 against pillar #96. Secure the top halves on bearings #92 of said pillars.

Install bushing blocks #93 into slots #18 in pillars #96 and #98. Install Transfer shaft #47 through both bushing blocks #93. Places sheaves #48 in belts #45 and #46 and slip over the ends of transfer shaft #47 as indicated in FIG. 23. Add takeup springs #94 to slots #18 of pillars #96 and #98.

For FIG. 1, join the partially assembled item #7 to the partially assembled item #32 by inserting the tubular end of item #32 into the hole of item #74, refer to FIGS. 10, 13, 14, 15 and 16. Align the faces of items #71 and #32 parallel and secure with set screw 190 52 of item #74. With the partially assembled hour angle frame #7 and the partially assembled indicator frame #32 joined together locate the hole of the indicator wheel end support #33 over the protruding end of the star chart drive shaft #16 and lower the assemblies into the halves of bearings #92 on pillars #95. Add the top halves to bearings #92 and secure.

For FIG. 1, cut belt #4 longer than required and put both ends together. Starting at the belt guides #41 in item #7 feed the belt #4 between items #41, through the tubular end of item #32 and between the items #41 in the indicator frame #32 and lay aside. Feed the power source wires #26 underneath items #41 in the same direction as the belt #4.

For FIG. 23, the installation of belt #4:

Cut belt #4 longer than required and with both ends together start in item #7. Thread the ends of belt #4 between the belt guides #41, through hollow shaft of item #56, through external belt guides support #43 and through external belt guides #44. With holes of item #43 vertical and the side of item #7 vertical install item

43 into item #56 and secure with set screws #52. Continue with belt #4 by threading both ends each through items #44, through the holes in item #43, through the tubular end of item #32 and between the internal belt guides #41 of item #32 and lay aside. With the holes of item #43 vertical and the tines of item #32 vertical, install item #43 into the tubular end of item #32 and secure. Insert items #44 into the holes in items #43. Thread the power source wires #26 through the third hole of item #43 in the indicator frame #32, go underneath items #41 and let hang.

For FIGS. 1 and 23: To install drive wheel assembly #5 hold open the loop of belt #4, insert one end of the declination shaft #54 of the drive wheel assembly #5 through the loop and into the hole #77 of item #71. Place item #5 against the belt guide side #71. Arrange the belt #4 around the circumference of item #53 as in FIG. 15 and snug up. The hole #77 of the hour angle frame lock side #72 fits over item #54, and the end holes #78 fit over the studs #79 thus holding #72 in place. Put nuts on studs and secure.

For FIGS. 1 and 23: Insert the indicator wheel #3 between the tines of item #32 and install the axle #31. Take the end of belt #4 that is on the top in item #32 and secure to item #3 next to the light spot assembly #21 with belt fastener #42 as in FIGS. 14 and 16. Rotate the indicator wheel #3 until the light assembly #21 is pointing down. Take the free end of belt #4, pull out all of the slack, and fasten to item #3 at the side of item #21 with belt fastener #42 as in FIGS. 14 and 16. Trim excess of item #4. Rotate item #3 until item #21 is pointing straight up, then on the drive wheel #53 at the lowest point install a belt fastener #42 as in FIG. 13.

For FIGS. 1 and 23; Connect wires #26 to the light spot assembly #21 and a power source. Rotate drive wheel #5 until the light spot #2 illuminates the star chart driven end #12. Focus the light spot #2 to the desired size by moving the focus tube #24 of item #21. Turn off the light.

For FIG. 1: To plumb the indicator wheel assembly #3 to the drive wheel assembly #5 release the set screw #52 of item #74 and reset after said assemblies are made plumb to each other.

For FIG. 23: To plumb the indicator wheel #3 to the drive wheel assembly #5 release the set screw of any sheave #48 and secure all sheaves #48 after said assemblies are made plumb to each other.

For FIGS. 1 and 23: To install the star chart equatorial divisions #13 the hour angles designated on item #13 must match with the same hour angles designated on the star chart driven end #12 and the star chart free end #11. The mounting holes #87 of item #13 will then mate with the threaded holes on joint tabs #15 and fasteners can be inserted to join item #13 to items #11 and #12.

Attach sight #6 to one end of declination shaft #54 and the required counter-weights to the opposite end of item #54.

HOW TO USE THE SPHERICAL STAR CHART WITH INDICATOR

Set up an equatorial mount at the place of observation.

Align the mount north and south and adjust the mount to the angle representing the latitude of the observer.

With the star chart driven end #12 pointed towards the celestial pole place The Spherical Start Chart With Indicator on the equatorial mount at a convenient eye level and clamp securely to the mount.

Connect the wires #26 to a power source.

Install the sight #6 and the counter-weights #55.

Turn on light spot #2.

Rotate the drive assembly wheel #5 until the light spot #2 illuminates the driven shaft #16 of the star chart #1.

Lock the drive wheel assembly #5 by turning item #76.

Disengage the clock #8 of the star chart #1 and wind.

By hand, rotate the star chart #1 until the appliqued symbols on item #1 arrange themselves to the positions of the celestial bodies in the polar region of the sky.

Engage the clock #8 and lock with wing nut #82.

For Northern Hemisphere Observations:

Install the clock #8 that rotates counter-clockwise to drive the star chart #1.

Install the clockwise rotating #8 in mount #81A but do not engage.

Unlock the sight #6 and sight the celestial body of Polaris. Move the equatorial mount north-south leg horizontally if necessary.

Lock the sight #6.

Place the protractor #67 on top of sight #6 parallel to the line of sight and make a mark on the masking tape where the string #65 is hanging.

Remove the protractor #67 and place on frame #9.

Adjust the equatorial mount vertically until the string #65 aligns with the mark made on the protractor #67.

Unlock sight #6 and relocate Polaris if necessary, then lock sight #6.

Unlock drive wheel assembly #5 with item #76.

Select another celestial object in the polar region such as Kochab of the Little Dipper and locate in sight #6. Observe the position of the light spot #2 on the surface of the star chart #1. If the light spot #2 does not illuminate the designated symbol loosen wing nut #82 and rotate clock #8.

With the symbol illuminated tighten item #82.

Four Southern Hemisphere Observations, and when Polar sightings are not practical.

Install the clock #8 that rotates clockwise to drive the star chart #1.

Install the counter-clockwise rotating item #8 in mount #81A but do not engage.

Select a celestial object near the polar region.

Place the protractor #67 on the frame #9 and mark the position of the string #65.

Remove the protractor and place on the sight #6 and adjust item #6 to the mark on item #67.

Lock the sight #6.

Unlock the drive wheel assembly #5 by loosening item #76.

Locate the chosen celestial object in sight #6 and observe the position of the light spot #2.

Disengage the clock #8.

Rotate the star chart #1 by hand until the light spot #2 is on the same longitude as the symbol of the observed object.

Engage the clock #8 and tighten item #82.

If the light spot #2 does not illuminate the symbol of the chosen celestial object, rotate the drive wheel assembly #5 until it does.

Move the north-south leg of the equatorial mount vertically until the chosen celestial object returns to the sight #6.

Select another celestial object in the region between the zenith and the equator.

Illuminate the symbol of this object on the star chart #1 by rotating items #5 and #7.

If the celestial object does not appear in the sight #6 move the north-south leg of the equatorial mount horizontally until it does.

I claim:

1. Apparatus for charting the movement of celestial bodies comprising a frame, means for sighting said celestial bodies shiftably carried by said frame, a translucent glode rotatably secured about an axis of said frame at one end, said globe pivotally secured to said sight means at its other end, light means positioned within said globe for focusing a spot of light on the globe corresponding to the position said sight means, and means for rotating said globe wherein said spot of light allows charting of the movement of said celestial bodies.

2. Apparatus of claim 1 wherein said light means includes a disk secured about said axis, a light source fixedly carried by said disk and means for delivering power to said light source.

3. Apparatus of claim 1 and timing means for controlling rotating movement of said globe.

4. Apparatus of claim 1 wherein said globe is formed of substantially flat elliptical segments joined together at their end points, and a cap covering each said segment end point.

5. Apparatus of claim 1 wherein said sight means is a telescope.

* * * * *